United States Patent
Stickel

(10) Patent No.: US 10,541,545 B2
(45) Date of Patent: Jan. 21, 2020

(54) APPARATUSES AND METHODS FOR REMOVING DEFECTIVE ENERGY STORAGE CELLS FROM AN ENERGY STORAGE ARRAY

(71) Applicant: MICRON TECHNOLOGY, INC., Boise, ID (US)

(72) Inventor: Shaun Stickel, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 125 days.

(21) Appl. No.: 15/839,506

(22) Filed: Dec. 12, 2017

(65) Prior Publication Data

US 2018/0102653 A1   Apr. 12, 2018

Related U.S. Application Data

(62) Division of application No. 13/771,877, filed on Feb. 20, 2013, now Pat. No. 9,866,043.

(51) Int. Cl.
*H02J 7/00* (2006.01)

(52) U.S. Cl.
CPC .......... *H02J 7/0031* (2013.01); *H02J 7/0026* (2013.01); *Y10T 307/696* (2015.04)

(58) Field of Classification Search
USPC ...................................................... 320/137
See application file for complete search history.

(56) References Cited

U.S. PATENT DOCUMENTS

| | | | |
|---|---|---|---|
| 6,051,955 A | 4/2000 | Saeki et al. | |
| 7,683,575 B2 | 3/2010 | Berdichevsky et al. | |
| 7,795,843 B2 | 9/2010 | Keates et al. | |
| 8,264,201 B2 | 9/2012 | Tae et al. | |
| 2004/0036446 A1 | 2/2004 | Iwashima | |
| 2008/0284383 A1* | 11/2008 | Aas | H02J 7/0031 320/164 |
| 2009/0190273 A1* | 7/2009 | Moran | B60K 6/28 361/16 |
| 2011/0080139 A1 | 4/2011 | Troxel et al. | |
| 2011/0128153 A1 | 6/2011 | Sims et al. | |
| 2011/0260687 A1* | 10/2011 | Kudo | H01M 10/425 320/118 |
| 2012/0091963 A1 | 4/2012 | Vance et al. | |

(Continued)

*Primary Examiner* — Mohammed Alam
(74) *Attorney, Agent, or Firm* — Dorsey & Whitney LLP

(57) ABSTRACT

Apparatuses and methods for removing a defective energy storage cell from an energy storage array is described. An apparatus includes an energy storage array including a plurality of energy storage cells, and a cell removal circuit coupled to the energy storage array. The cell removal circuit is configured to prevent a defective energy storage cell of the plurality of energy storage cells from causing other energy storage cells of the plurality of energy storage cells to become defective. A method includes receiving power at a charging node of an energy storage array, the energy storage array including a plurality of energy storage cells. Responsive to failure of an energy storage cell of the plurality of energy storage cells, current is provided through the defective energy storage cell, and responsive to the defective energy storage cell becoming an open circuit, discontinuing provision of the current through the defective energy storage cell.

5 Claims, 5 Drawing Sheets

(56) References Cited

U.S. PATENT DOCUMENTS

| | | | |
|---|---|---|---|
| 2012/0091964 A1* | 4/2012 | Vance | B60L 3/0046 |
| | | | 320/122 |
| 2012/0146652 A1 | 6/2012 | Aoki et al. | |
| 2014/0015488 A1 | 1/2014 | Despesse | |
| 2014/0232324 A1* | 8/2014 | Readio | H02J 7/0016 |
| | | | 320/107 |
| 2014/0232353 A1* | 8/2014 | Stickel | H02J 7/0031 |
| | | | 320/137 |

* cited by examiner

APPARATUSES AND METHODS FOR REMOVING DEFECTIVE ENERGY STORAGE CELLS FROM AN ENERGY STORAGE ARRAY

CROSS-REFERENCE TO RELATED APPLICATIONS

This application is a divisional of U.S. patent application Ser. No. 13/771,877, filed Feb. 20, 2013, issued as U.S. Pat. No. 9,866,043 on Jan. 9, 2018. These application and patent are incorporated by reference herein in their entirety and for all purposes.

TECHNICAL FIELD

Embodiments of the invention relate generally to energy storage arrays, and more particularly, in one or more of the illustrated embodiments, to removal of defective energy storage cells from an energy storage array.

DESCRIPTION OF RELATED ART

Electronic devices are susceptible to data loss if not permitted to perform an orderly shutdown, for example, when there is a loss of power. In order to prevent data loss, electronic devices often employ energy storage systems that provide auxiliary power for a short time period in the event of a sudden loss of power. The energy storage systems may include an array or arrays of energy storage cells that charge when power is provided and discharge when power is no longer provided, for example, during loss of power. The discharging energy storage cells may provide temporary auxiliary power such as to perform an orderly shutdown. A single defective cell within an energy storage array may lead to failure of an entire array. Loss of an energy storage array may reduce available energy to be used during a power loss event, and in some instances, may prevent an electronic device from operating properly.

DETAILED DESCRIPTION

Certain details are set forth below to provide a sufficient understanding of embodiments of the invention. However, it will be clear to one having skill in the art that embodiments of the invention may be practiced without these particular details. Moreover, the particular embodiments of the present invention described herein are provided by way of example and should not be used to limit the scope of the invention to these particular embodiments.

Figure 1:
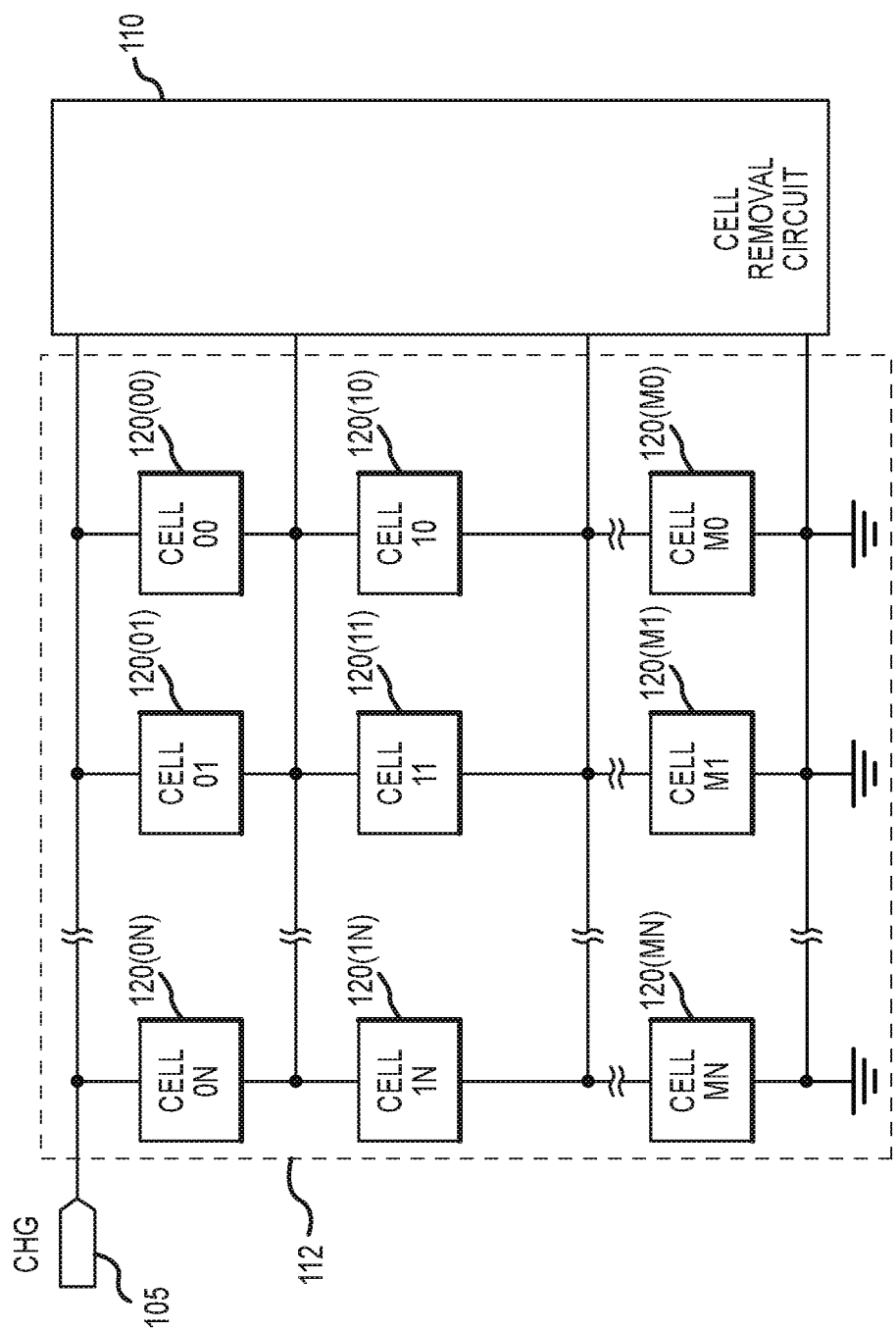
FIG. 1 is a block diagram of a particular illustrative embodiment of an apparatus including a cell removal circuit.

Referring to FIG. 1, a particular illustrative embodiment of an apparatus including a cell removal circuit 110 is disclosed and generally designated 100. The apparatus may be an integrated circuit, a memory device, a memory system, a solid state memory device, an electronic device or system, a smart phone, a tablet, a computer, a server, etc. The apparatus 100 may include an energy storage array 112 coupled to the cell removal circuit 110, and include energy storage cells 120(00-MN). The energy storage cells are arranged as rows 0-M and columns 0-N. The cell removal circuit 110 may be configured to remove defective (e.g., failed) ones of the energy storage cells 120(00-MN).

The energy storage cells 120(00-MN) of the energy storage array 112 may be coupled in a series or parallel configuration. In an embodiment, the energy storage array 112 may include N+1 columns and M+1 rows of energy storage cells, with the energy storage cells 120(00-MN) in each row coupled to a common upper node and a common lower node. In an embodiment, first energy storage cells 120(00-ON) along a first row (0) of the energy storage array 112 are coupled to a charging node 105 and last energy storage cells 120(M0-MN) along a last row (M) are coupled to a reference (e.g., a ground) node. The energy storage cells 120(00-MN) may be substantially similar to each other. For example, each of the energy storage cells 120(00-MN) may have a similar energy storage capacity. In an embodiment, the energy storage cells 120(00-MN) may include a circuit or circuits (e.g., capacitors and/or batteries) configured to store energy.

In operation, a charger (not shown) coupled to the charging node 105 may be configured to provide electrical power to charge the energy storage cells 120(00-MN) of the energy storage array 112. For example, the energy storage array 112 may be provided a voltage on the charging node 105. While the voltage is provided to the energy storage array 112, the energy storage cells 120(00-MN) may be charged to and maintained at an approximately fully charged state.

Responsive to an energy storage cell of the energy storage cells 120(00-MN) becoming defective, the cell removal circuit 110 may be configured to prevent the defective energy storage cell from causing other energy storage cells of the energy storage array 112 to become defective. Examples of failure modes of the defective energy storage cell may be an open circuit, a short circuit, or another failure mode. When the failure mode of the defective energy storage cell is a short-circuit failure mode, two rows of the energy storage array 112 adjacent to the row including the defective energy storage cell are short-circuited together through the defective energy storage cell. The short-circuited rows may cause non-defective energy storage cells of the row including the defective energy storage cell to become defective or other energy storage cells of the energy storage cells 120 (00-MN) to become defective, thus causing the energy storage array 112 to fail. The cell removal circuit 110 may be configured to remove (e.g., decouple, disable, etc.) the defective energy storage cell from the energy storage array 112, which may prevent failure of the energy storage array 112.

In an embodiment, responsive to a short-circuit failure mode, the cell removal circuit 110 may be configured to provide current to the defective energy storage cell to remove the defective energy storage cell from the energy storage array 112. For example, the current provided to the defective energy storage cell may cause the defective energy storage cell to become an open circuit, and thus, remove the defective energy storage cell from the energy storage array 112. In some embodiments, the current provided to the defective energy storage cell may be based on the voltage provided to the charging node 105.

Figure 2:
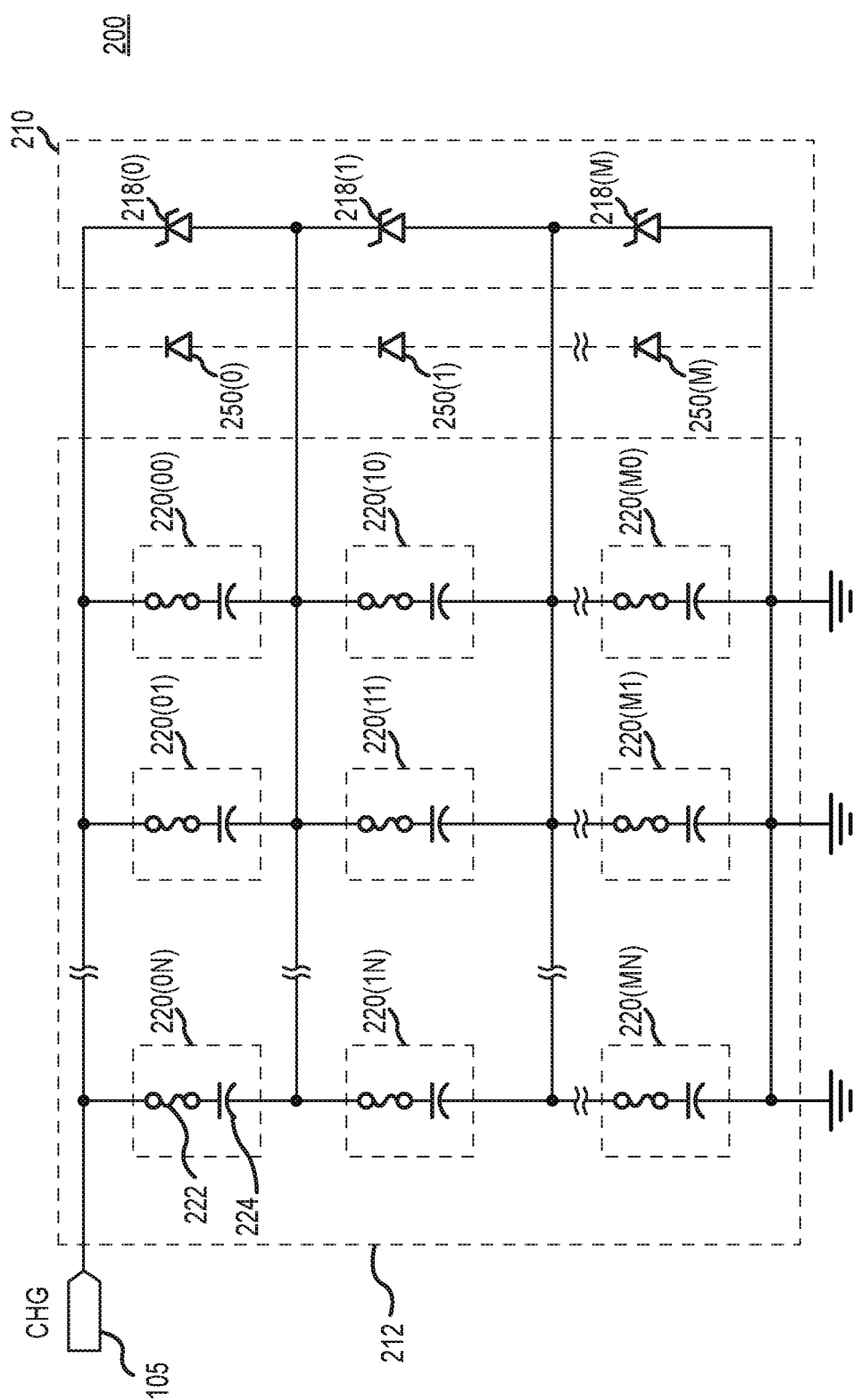
FIG. 2 is a block diagram of a particular illustrative embodiment of an apparatus including a cell removal circuit.

Referring to FIG. 2, a particular illustrative embodiment of an apparatus including a cell removal circuit 210 is disclosed and generally designated 200. The apparatus 200 may include the cell removal circuit 210 configured to remove a defective energy storage cell from an energy storage array 212 that includes energy storage cells 220(00-MN). The cell removal circuit 210 may include the cell removal circuit 110 of FIG. 1, the energy storage array 212 may include the energy storage array 112 of FIG. 1, and the energy storage cells 220(00-MN) may include the energy storage cells 120(00-MN) of FIG. 1.

Similar to the energy storage array 112 of FIG. 1, the energy storage array 212 may include energy storage cells 220(00-MN) forming an array of N+1 columns and M+1 rows of energy storage cells. The energy storage cells 220(00-MN) in each row are coupled to a common upper node and a common lower node. Further, energy storage cells 220(00-ON) along a first row (0) of the energy storage array 212 are coupled to a charging node 105 and energy storage cells 220(M0-MN) along a last row (M) are coupled to a reference (e.g., a ground) node. Each of the energy storage cells 220(00-MN) may be substantially similar. For example, each of the energy storage cells 220(00-MN) may be configured to include a similar energy storage capacity. In an embodiment depicted in FIG. 2, the energy storage cells 220(00-MN) may include a sacrificial component (e.g., a fuseable link or a fuse) 222 and an energy storage component (e.g., capacitors and/or batteries) 224. One of ordinary skill in the art would recognize that the sacrificial component 222 may be included to improve reliability, and may be removed from the energy storage cells 220(00-MN) for other embodiments.

In some embodiments, the apparatus 200 may include a column of diodes 250(0-M) coupled in parallel with columns of energy storage cells 220(00-MN) of the energy storage array 212, with each of the diodes 250(0-M) associated with a respective row of the energy storage array 212. The diodes 250(0-M) may be configured to prevent an energy storage cell 220(00-MN) from being subject to a relatively large reverse voltage. One of ordinary skill in the art would recognize that inclusion of the diodes 250(0-M) may be included to improve reliability of the energy storage array 212, and that the diodes 250(0-M) may be absent from the apparatus 200 for some embodiments.

The cell removal circuit 210 may include a column of zener diodes 218(0-M) coupled in parallel with columns of energy storage cells 220(00-MN) of the energy storage array 212, with each of the zener diodes 218(0-M) associated with a row of the energy storage array 212.

In operation, a charger (not shown) coupled to the charging node 105 may be configured to provide electrical power to charge the energy storage cells 220(00-MN) of the energy storage array 212. While power is supplied to the charging node 105, the energy storage cells 220(00-MN) may be charged to and maintained at an approximately fully charged state. While the energy storage cells 220(00-MN) charging, the zener diodes 218(0-M) may be non-conductive.

Responsive to a short-circuit failure of an energy storage cell of the energy storage cells 220(00-MN), a voltage across the other energy storage cells 220(00-MN) may increase in order to maintain a constant overall voltage across the energy storage array 212. For example, the short-circuited energy storage cell causes the same voltage provided to the charging node 105 to be dropped over one less row of energy storage cells, thereby increasing the voltage across the other energy storage cells 220(00-MN). The voltage increase across the other energy storage cells 220(00-MN) may result in a substantially similar increase in the voltage across the zener diodes 218(0-M), except for the zener diode associated with the row that includes the defective energy storage cell. The increase in the voltage across the zener diodes 218(0-M) may exceed the zener threshold voltage, except the zener diode associated with the row of the short circuited energy cell, and thus the zener diodes 218(0-M) may be conductive (e.g., the zener diodes 218(0-M) may be configured in a reverse-bias mode).

The reverse-biased zener diodes 218(0-M) may form a path from the charging node 105 through the zener diodes 218(0-M) and the defective energy storage cell to the reference node. That is, since the zener diode associated with the row including the defective cell may continue to be non-conductive, the current flowing along the column of the zener diodes 218(0-M) may divert from the column of zener diodes 218(0-M) and flow through the defective energy storage cell for the row containing the defective energy storage cell. The flow of the current through the defective energy storage cell may remove the defective energy storage cell from the energy storage array 212 by causing the defective energy storage cell to become an open circuit by blowing the sacrificial component (e.g., the fuseable link or the fuse) 222, if included, or blowing the energy storage component 224 of the defective energy storage cell.

Once the defective energy storage cell has been removed, the voltage across the other energy storage cells 220(00-MN) may be reduced. Similarly, the voltage across the zener diodes 218(0-M) may also be reduced to a value that is less than the zener voltage threshold. Thus, the zener diodes 218(0-M) may be non-conductive (e.g., the zener diodes 218(0-M) may be configured in a forward-bias mode), and discontinue provision of the current through the defective energy storage device. The overall storage capacity of the energy storage array 212 may be reduced responsive to removal of the defective energy storage cell. However, the remaining energy storage cells 220(00-MN) may nonetheless provide sufficient power storage for proper operation.

Figure 3:
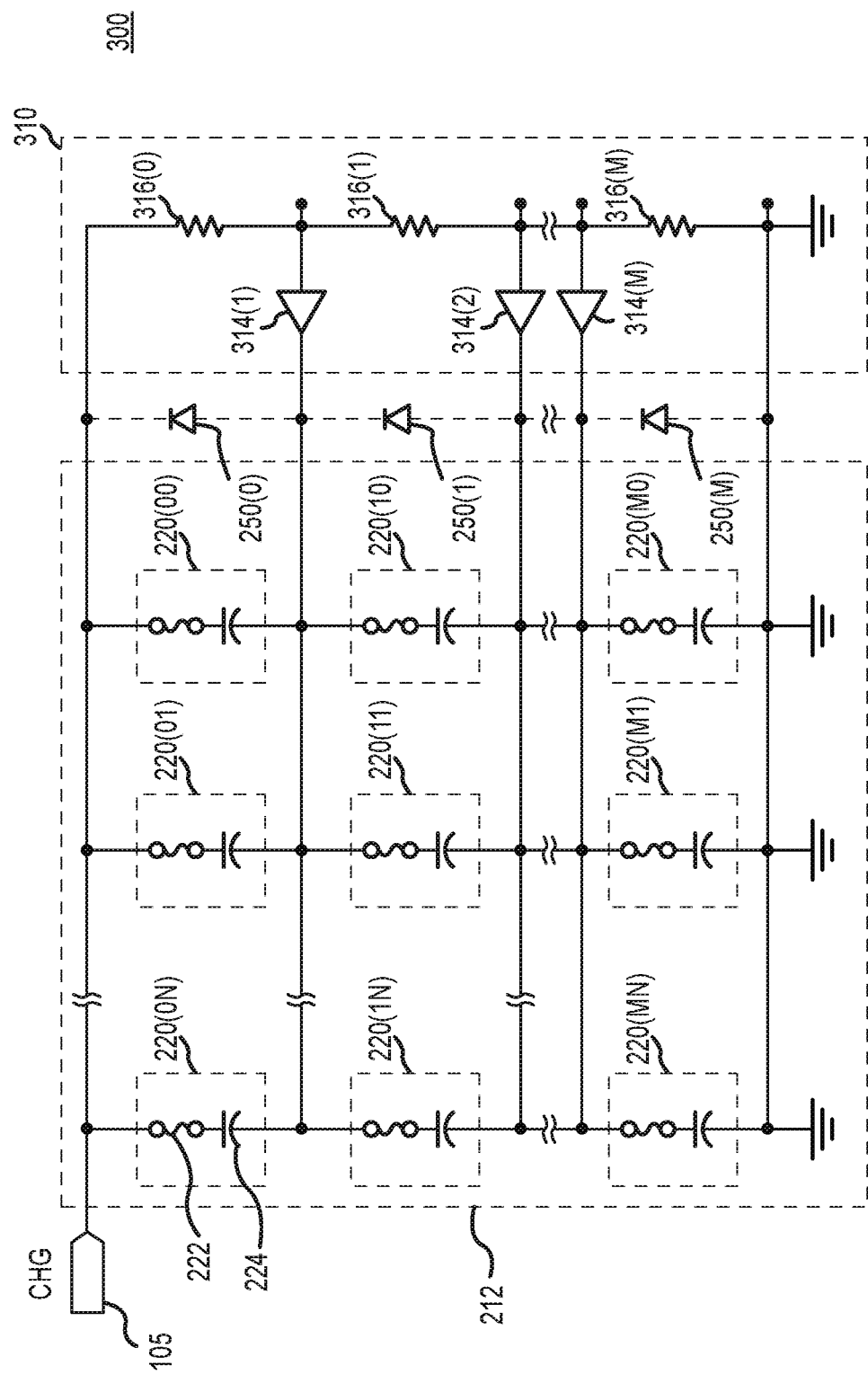
FIG. 3 is a block diagram of a particular illustrative embodiment of an apparatus including a cell removal circuit.

Referring to FIG. 3, a particular illustrative embodiment of an apparatus including a cell removal circuit is disclosed and generally designated 300. The apparatus 300 may include a cell removal circuit 310 configured to remove a defective energy storage cell from an energy storage array 212 that includes energy storage cells 220(00-MN). The cell removal circuit 310 may include the cell removal circuit 110 of FIG. 1. The energy storage array 212 may include the energy storage array 112 of FIG. 1 and/or the energy storage array 212 of FIG. 2. The energy storage cells 220(00-MN) may include the energy storage cells 120(00-MN) of FIG. 1 and/or the energy storage cells 220(00-MN) of FIG. 2. The apparatus 300 includes elements that have been previously described with respect to the apparatus 200 of FIG. 2. Those elements have been shown in FIG. 3 using the same reference numbers used in FIG. 2 and operation of the common elements is as previously described. Consequently, a detailed description of the operation of these elements will not be repeated in the interest of brevity.

The cell removal circuit 310 may include buffers 314(1-M) coupled to a node between each row of the energy storage cells 220(00-MN) of the energy storage array 212. The cell removal circuit 310 may also include a column of resistors 316(0-M) in parallel with columns of the energy storage cells. The buffers 314(1-M) may be configured to provide current into an associated node via a charger (not shown) coupled an input of the corresponding buffers 314(1-M) to provide electrical power. In an embodiment, the charger may be a multiple output charger. In some embodiments, the buffers 314(1-M) may include operational amplifiers, drivers, and/or low drop-out (LDO) regulators.

In operation, a first charger coupled to the charging node 105 may be configured to charge the energy storage cells 220(00-MN) of the energy storage array 212. Responsive to a short-circuit failure of an energy storage cell of the energy storage cells 220(00-MN), a buffer of the buffers 314(1-M) that corresponds to an upper node of the defective energy storage cell may be configured to provide current through the defective energy storage cell via the upper node. The current may be provided to the buffer via a second charger (not shown) coupled to the input of the buffer. In an embodiment, a multiple output charge may include the first charger and the second charger, with a first output including the first charger and a second output including the second charger.

The flow of the current through the defective energy storage cell may remove the defective energy storage cell from the energy storage array 212 by causing the defective energy storage cell to become an open circuit (e.g., by blowing the sacrificial component (e.g., the fuseable link or the fuse) 222, if included, or blowing the energy storage component 224). Once the defective energy storage cell has been removed from the energy storage array 212, the buffer may discontinue provision of the current through the defective energy storage cell. In an embodiment, the buffer and/or the second charger may detect failure of the defective circuit element. In another embodiment, the buffer and/or the second charger may detect removal of the defective energy storage cell. The overall storage capacity of the energy storage array 212 may be reduced responsive to removal of the defective energy storage cell. However, the remaining energy storage cells 220(00-MN) may nonetheless provide sufficient power storage for proper operation.

Figure 4:
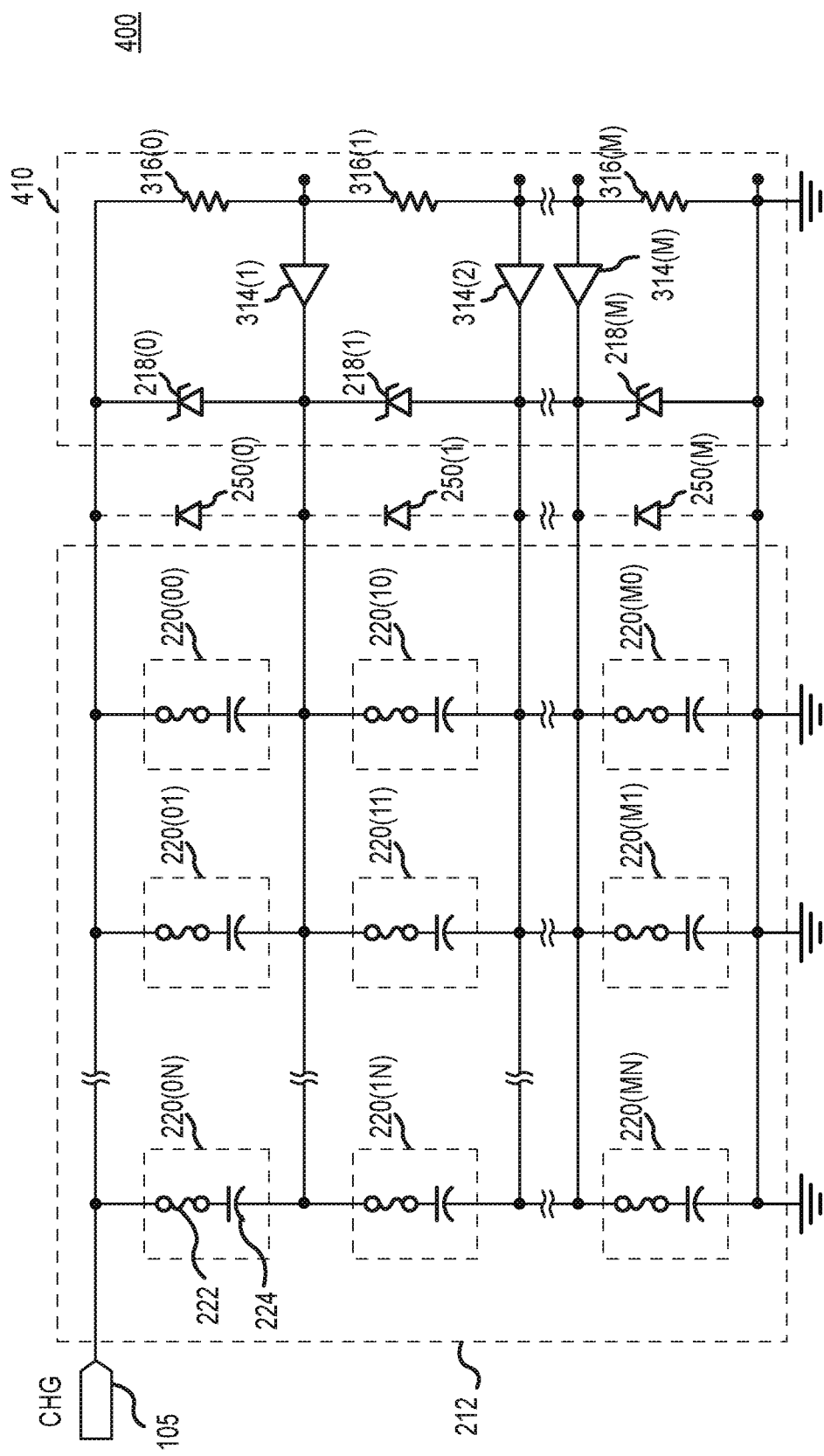
FIG. 4 is a block diagram of a particular illustrative embodiment of an apparatus including a cell removal circuit.

Referring to FIG. 4, a particular illustrative embodiment of an apparatus including a cell removal circuit is disclosed and generally designated 400. The apparatus 400 may include a cell removal circuit 410 configured to remove a defective energy storage cell from an energy storage array 212 that includes energy storage cells 220(00-MN). The cell removal circuit 410 may include the cell removal circuit 110 of FIG. 1, the cell removal circuit 210 of FIG. 2, the cell removal circuit 310 of FIG. 3, or any combination thereof. The energy storage array 212 may include the energy storage array 112 of FIG. 1, and/or the energy storage array 212 of FIG. 2 and FIG. 3. The energy storage cells 220(00-MN) may include the energy storage cells 120(00-MN) of FIG. 1 and/or the energy storage cells 220(00-MN) of FIG. 2 and FIG. 3. The apparatus 400 includes elements that have been previously described with respect to the apparatus 200 of FIG. 2 and/or the apparatus 300 of FIG. 3. Those elements have been shown in FIG. 4 using the same reference numbers used in FIG. 2 and/or FIG. 3 and operation of the common elements is as previously described. Consequently, a detailed description of the operation of these elements will not be repeated in the interest of brevity.

In operation, a first charger coupled to the charging node 105 may be configured to charge the energy storage cells 220(00-MN) of the energy storage array 212. Each of the energy storage cells 220(00-MN) may include a similar energy storage capacity. While the energy storage cells 220(00-MN) are charging, the zener diodes 218(0-M) may be configured in a forward-bias mode by having a voltage that is less than a zener threshold voltage. Thus, the zener diodes 218(0-M) are non-conductive.

As explained with reference to FIG. 2, responsive to a short-circuit failure of an energy storage cell of the energy storage cells 220(00-MN), a voltage across the other energy storage cells 220(00-MN) may increase causing the voltage across the zener diodes 218(0-M) to exceed the zener threshold voltage. Thus, the zener diodes 218(0-M) may be configured in a reverse-bias mode to provide current along a path including one or more zener diodes along the column of the zener diodes 218(0-M) and the defective energy storage cell. Further responsive to the short-circuit failure of the defective energy storage cell, one or more of the buffers 314(1-M) may be configured to provide additional current along the zener diode path and through the defective energy storage cell via a second charger coupled to an input of the one or more of the buffers 314(1-M). In some embodiments, the one or more of the buffers 314(1-M) may include the buffer coupled to the upper node of the defective energy storage cell. In an embodiment, the one or more of the buffers 314(1-M) may include buffers 314(1-M) extending from the charging node 105 to an upper node of the defective energy storage cell, including the buffer coupled to the upper node of the defective energy storage cell.

As explained with reference to FIGS. 2 and 3, the current flowing along the column of the zener diodes 218(0-M), including the additional current from the one or more of the buffers 314(1-M), may flow along a path including the defective energy storage cell. The flow of the current along the path may remove the defective energy storage cell from the energy storage array 212 by causing the defective energy storage cell to become an open circuit. The additional current from the one or more of the buffers 314(1-M) may reduce an amount of time required to cause the defective energy storage cell to become an open circuit. Once the defective energy storage cell has been removed, the voltage differential across the zener diodes 218(0-M) may be reduced to a value that is less than the zener voltage threshold, configuring the zener diodes 218(0-M) in a forward-bias mode. Further, the one or more of the buffers 314(1-M) may be configured to discontinue provision of current through the defective energy storage cell. The overall storage capacity of the energy storage array 212 may be reduced responsive to removal of the defective energy storage cell. However, the remaining energy storage cells 220(00-MN) may nonetheless provide sufficient power storage for proper operation.

Figure 5:
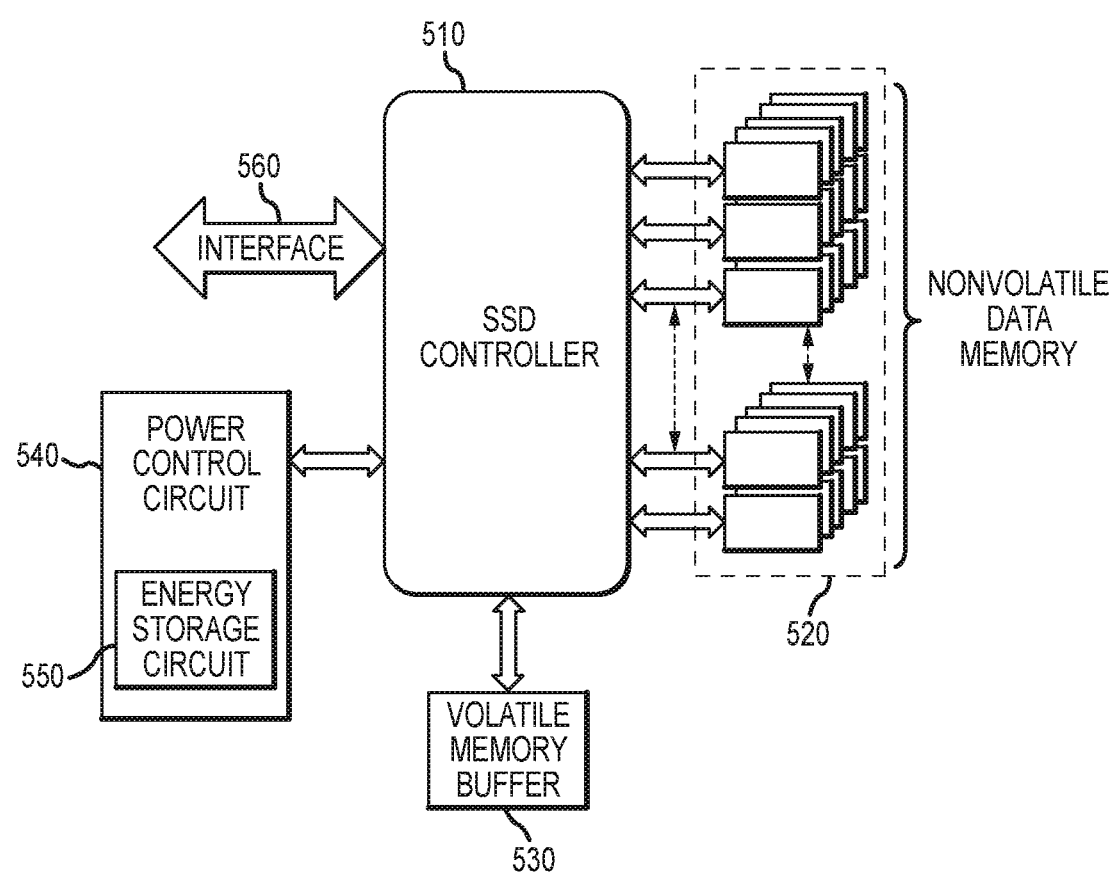
FIG. 5 is a block diagram of a solid-state memory device including a cell removal circuit according to an embodiment of the invention.

Referring to FIG. 5, block diagram of a solid-state memory device (SSD) 500 including an energy storage circuit 550. The SSD 500 may include an one or more arrays of non-volatile memory 520, such as NAND flash memory or NOR flash memory. The SSD 500 includes a SSD controller 510 that may receive memory commands through an interface 560 and provide (e.g., generate) control signals within the SSD 500 to carry out various memory operations. The SSD controller 510 may be coupled to a volatile memory buffer 530 configured to store data received by the SSD controller from the interface 560 and/or the an one or more arrays of non-volatile memory 520.

The SSD 500 may include a power control circuit 540 configured to control power within the SSD 500. The power control circuit 540 may include the energy storage circuit 550. The power control circuit 540 may be configured to charge one or more energy storage arrays of the energy storage circuit 550 and to provide power stored in the one or more energy storage arrays of the energy storage circuit 550 to other circuits of the SSD 500. The energy storage arrays of the energy storage circuit 550 may include a plurality of energy storage cells configured to store energy. In an embodiment, the energy storage circuit 550 may be configured to provide backup power responsive to a power loss event. For example, the energy storage circuit 550 may provide backup power to the SSD controller 510 and the non-volatile-type memory 520 to facilitate backup power functions when there is a loss of power. The energy storage circuit 550 may include the apparatus 100 of FIG. 1, the apparatus 200 of FIG. 2, the apparatus 300 of FIG. 3, the apparatus 400 of FIG. 4, or any combination thereof. The energy storage circuit 550 may include a cell removal circuit configured to remove a defective energy storage cell according to one of the embodiments described above or some other embodiment. The cell removal circuit may include the cell removal circuit 110 of FIG. 1, the cell removal circuit 210 of FIG. 2, the cell removal circuit 310 of FIG. 3, the cell removal circuit 410 of FIG. 4, or any combination thereof. For example, the cell removal circuit may be configured to remove the defective energy storage cell by providing current through the defective storage cell causing the defective energy storage cell to become an open circuit.

Those of ordinary skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends on the particular application and design constraints imposed on the overall system. Skilled artisans may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
    receiving a charging voltage at a first plurality of energy storage cells of a first row of an energy storage array;
    propagating a portion of the charging voltage to a second plurality of energy storage cells of a second row of the energy storage array from the first row;
    responsive to failure of an energy storage cell of the first plurality of energy storage cells of the first row, providing current through the defective energy storage cell to a reference node, wherein providing current through the defective energy storage cell to a reference node comprises:
        reverse-biasing a zener diode coupled in parallel with the second plurality of energy storage cells of the second row of the energy storage array;
        providing current through the defective energy storage device to a reference node via the reverse-biased zener diode; and
        providing current through the defective energy storage device via a buffer of the cell removal circuit; and
    responsive to the defective energy storage cell becoming an open circuit, discontinuing provision of the current through the defective energy storage cell, wherein discontinuing provision of the current through the defective energy storage cell comprises forward-biasing the zener diode responsive to the defective energy storage cell becoming an open circuit.

2. The method of claim 1, wherein the current is based on the charging voltage.

3. The method of claim 1, further comprising:
    detecting failure of the energy storage cell at a buffer of the cell removal circuit; and
    responsive to detecting failure of the energy storage cell, providing current to the defective energy storage cell via the buffer.

4. The method of claim 1, further comprising blowing a sacrificial component of the defective energy storage cell responsive to the current to cause the defective energy storage cell to become an open circuit.

5. The method of claim 1, wherein block the sacrificial component of the defective energy storage cell comprises blowing a fuse.

* * * * *